United States Patent [19]

Fukao et al.

[11] Patent Number: 4,957,409

[45] Date of Patent: Sep. 18, 1990

[54] CORRUGATED CARDBOARD BOX STACKING DEVICE IN A CORRUGATED CARDBOARD BOX MAKING MACHINE

[75] Inventors: Masuzo Fukao, Isubata; Tadashi Sakai, Komatsu; Kozo Murohashi, Kanazawa, all of Japan

[73] Assignee: Kabushiki Kaisha Ishikawa Seisakusho, Ltd., Kanazawa, Japan

[21] Appl. No.: 400,772

[22] Filed: Aug. 30, 1989

[51] Int. Cl.[5] .......................... B31B 3/98; B65G 57/30; B65G 60/00; B65H 31/30

[52] U.S. Cl. .............................. 414/788.4; 414/790.3; 414/795.1; 414/796; 414/796.6; 414/796.8; 493/29; 493/52; 493/480

[58] Field of Search ............... 414/788.4, 788.9, 790.3, 414/795.1, 796, 796.6, 796.8; 493/10, 28, 29, 35, 52, 480

[56] References Cited

U.S. PATENT DOCUMENTS

| | | | |
|---|---|---|---|
| 1,154,451 | 9/1915 | Staude | 493/480 |
| 2,931,520 | 4/1960 | Shields | 493/480 |
| 3,420,387 | 1/1969 | Baum | 414/788.4 |
| 3,601,265 | 8/1971 | Shields | 414/795.1 |
| 3,744,649 | 7/1973 | Ward, Jr. | 414/796 |
| 4,425,068 | 1/1984 | Wilson et al. | 414/795.1 |
| 4,522,617 | 6/1985 | Mowry | 414/790.3 |
| 4,678,388 | 7/1987 | Okamoto | 414/790.3 |

*Primary Examiner*—William E. Terrell
*Attorney, Agent, or Firm*—Burns, Doane, Swecker & Mathis

[57] ABSTRACT

A corrugated cardboard box stacking device in a corrugated cardboard box making machine wherein the space for stacking manufactured and folded corrugated cardboard boxes is divided into two of lower and upper spaces of a corrugated cardboard box storing space and a corrugated cardboard box stacking space which is positioned above and a little ahead of the storing space, and the uppermost cardboard box of a group of stacked corrugated cardboard boxes is moved by a kicker one by one to the corrugated cardboard box stacking space where a group of the corrugated cardboard boxes are moved at once to a delivery belt by a pusher bar when the number of the boxes have reached a predetermined number. The pusher bar does not affect the group of the corrugated cardboard boxes stacked in the storing space and an exact number of a group of the corrugated cardboard boxes in the stacking space can be moved at once to the delivery belt and the like.

3 Claims, 6 Drawing Sheets

CORRUGATED CARDBOARD BOX STACKING DEVICE IN A CORRUGATED CARDBOARD BOX MAKING MACHINE

BACKGROUND OF THE INVENTION

1. Field of the Invention

The present invention relates to a corrugated cardboard box stacking device in a corrugated cardboard box making machine wherein thinly folded corrugated cardboard boxes successively transported from a folding section are stacked one by one, and then a group of the stacked boxes are discharged at once since it is necessary to bundle a predetermined number of the corrugated cardboard boxes for facilitating the handling of the boxes.

2. Description of Related Art

A conventional corrugated cardboard box stacking device generally has a structure as shown in FIG. 10. In other words, corrugated cardboard boxes A formed in the folding section E are fed one by one to the corrugated cardboard box stacking device in the horizontal direction, and then the boxes are forwarded onto a feed belt 52 passing through a pair of rotary screws 51 provided at left and right sides. Thereafter, they are advanced by the feed belt 52 and stopped by hitting a stopper 53 As a result, the front portion of the box A is supported on the feed belt 52 and both of the rear sides are supported on spiral vanes 51*a* of the rotary screws 51. The rotary screw 51 is provided with a spiral vane 51*a* which is wound around a multiplicity of times and the corrugated cardboard boxes A are stacked upward from lower portion in the area between the spiral vane 51*a* having a little space between each of the boxes. With rotation of the rotary screws 51, the corrugated cardboard box A is successively lifted and the boxes are also stacked on the top portion 51*t* of the rotary screws 51 and the top portion 53*t* of the back stopper 53 as shown in FIG. 10. When the number of corrugated cardboard boxes stacked on both of the top portions 51*t*,53*t* reached a predetermined number of sheets, a pusher bar 54 is advanced as shown by phantom line in FIG. 10 and a predetermined number of corrugated cardboard boxes A are moved at once toward discharge rollers 55. A stacked group of the corrugated cardboard boxes moved onto the discharge rollers 55 are conveyed to a predetermined location to be bundled thereat.

In the above-mentioned example of conventional device, however, there is a problem that when the pusher bar 54 is advanced, the box Ay supported on the uppermost of the rotary screws 51 is taken out together with the bottommost box Ax of a group of the corrugated cardboard boxes transported by the pusher bar 54 and the boxes exceeding the predetermined number are transported by the pusher bar 54.

SUMMARY OF THE INVENTION

An object of the present invention is to provide a corrugated cardboard box stacking device in a corrugated cardboard box making machine which is capable of transporting a number of corrugated cardboard boxes in accurate quantity to a discharge means in the stacked state.

In order to accomplish the above-mentioned object, the corrugated cardboard box stacking device of the present invention comprises the following means.

(1) A feed means for feeding manufactured and folded corrugated cardboard boxes one by one in the horizontal direction. In an embodiment, a pair of feed rollers 1*a*,1*b* positioned at the end of a folding section E and belts 2*a*,2*b* wound around the rollers correspond to this means.

(2) A front portion support means for supporting the front portion of the corrugated cardboard box fed from the feed means at a predetermined position. In the embodiment, a feed belt 4 corresponds to this means, and a back stopper 7 is provided for regulating the front position of the leading edge of the corrugated cardboard box A.

(3) A pair of rotary screws provided at right and left sides for stacking the corrugated cardboard boxes from below to upper portion in the area between said rotary screws, the rotary screws being arranged at intermediate position between the feed means and the front portion support means for supporting both side edges of the corrugated cardboard box fed from the feed means to raise the box by its rotation. As it is clear from the rotary screw 3 described in the embodiment, the rotary screw of the present invention may be provided with a spiral vane 3*a* which is wound around a fewer times in number of winding, and it will be enough if it can support two or three sheets of the corrugated cardboard boxes.

(4) A gauge plate which comes in contact with the upper surface of the rear edge of the uppermost corrugated cardboard box of a group of the boxes stacked in a box storing space positioned above the support means and the rotary screws for regulating the number of a group of the cardboard boxes to be stored therein. The gauge plate 13 as shown in the embodiment may be applied. This gauge plate 13 functions to divide a storing space P and a stacking space Q (FIG. 6) into lower and upper spaces as the top portions 51*t* of the rotary screw 51 shown in FIG. 10 functions.

(5) A kicker which moves forward and backward along the under surface of the gauge plate and pushes out the uppermost corrugated cardboard box to advance it a little from the front edge of the gauge plate. The kicker as described in the embodiment may be applied, and various means for moving the kicker may be utilized. As a matter of course, the retreated position of the kicker 13 is positioned a little rear from the rear end of the uppermost corrugated cardboard box $A_1$ (FIG. 7).

(6) A count means for counting the number of the corrugated cardboard boxes moved from the storing space to the stacking space which is positioned above and a little ahead of the storing space by the pushing action of the kicker and the lifting action of the rotary screws. As described in the embodiment, a sensor 30 which directly counts the corrugated cardboard boxes pushed out by the kicker 11 may be utilized, however, various means already known well may be applied as it is possible for them to indirectly count the number of the corrugated cardboard boxes by detecting the forward and backward movement of the kicker 11.

(7) A pusher bar for transporting a group of the corrugated cardboard boxes in the box stacking space by moving them forward when the number of the corrugated cardboard boxes stacked from below in the storing space reached a predetermined number of sheets. It is preferable to utilize a pusher bar which is generally positioned behind the corrugated cardboard box stacking space Q to regulate the position of the rear end of the box and is returned to the original position after its advancing action is taken as the pusher bar 27 shown in the embodiment. It is also preferable to use a pusher bar which is arranged to be moved forward and backward by air cylinder 28.

(8) A discharge means for discharging a group of the stacked corrugated cardboard boxes conveyed by the pusher bar. As a discharge means, the delivery belt 10 as described in the embodiment may be utilized, however, the group of discharge rollers shown in FIG. 10 may also be used.

As described in the embodiment, it may preferably be constructed in such a manner that a rotary stopper 8 is disposed in front of the corrugated cardboard box stacking space Q, the front edge portion of the corrugated cardboard box A is supported on the supporting surface 8*b* of the rotary stopper 8, while the front edge position of the corrugated cardboard box A is regulated by the stopper surface 8*c* of the rotary stopper 8, and the rotary stopper 8 is rotated when the pusher bar 27 is advanced to guide a group of the corrugated cardboard boxes in the box stacking space to the discharge means 10.

According to the present invention, the corrugated cardboard box stacking space is distinctly devided by the gauge plate into a box storing space and a box stacking space which is positioned above and a little ahead of the storing space, and the corrugated cardboard box positioned uppermost of a group of the boxes stacked in the storing space is successively moved to the stacking space by the kicker. When the number of the corrugated cardboard boxes successively stacked from below to the upper portion in the stacking space have reached a predetermined number, they are discharged all together by the pusher bar. The pusher bar does not affect the group of the corrugated cardboard boxes stacked in the storing space, and only moves the group of the corrugated cardboard boxes stacked in the stacking space to the discharge means so that a phenomenon of bringing out the box in the storing space as seen in the conventional device can be surely prevented. Consequently, according to the present invention, an exact number of corrugated cardboard boxes can be transported to the discharge means in the stacked state.

These and other objects and features of the present invention will become more apparent from the following description taken in conjunction with the preferred embodiment thereof with reference to the accompanying drawings.

DESCRIPTION OF THE PREFERRED EMBODIMENTS

An embodiment of the present invention will now be described with reference to accompanying drawings.

A corrugated cardboard box making machine is arranged to manufacture corrugated cardboard boxes primarily in the following procedures.

(1) In a feed section, corrugated cardboard sheets are fed to a printing section one by one.

(2) In the printing section, printing is made on the corrugated cardboard sheet.

(3) In creaser-slotter section, the corrugated cardboard sheet is processed for ruling and slotting.

(4) In a folding section, one end of the corrugated cardboard sheet is glued first, and then the sheet is folded along the ruled line, and finally, the glued portion is glued together by folding the sheet to form a folded corrugated cardboard box.

(5) In a delivery section, the folded corrugated cardboard boxes are successively stacked, and a group of the boxes are discharged at once when the number of the sheets have reached a predetermined number.

Figure 1:
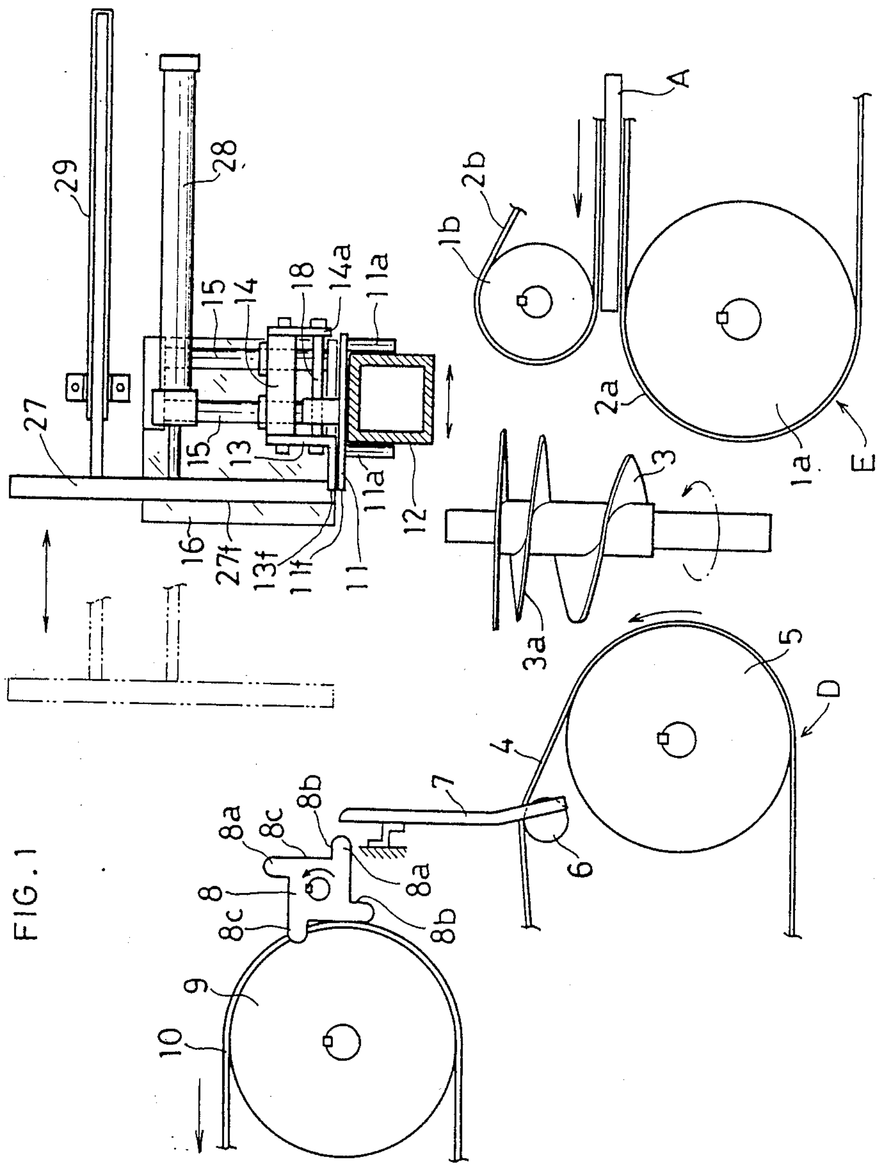
FIG. 1 is a side view of a corrugated cardboard box stacking device in a corrugated cardboard box making machine to which the present invention is applied.
Figure 2:
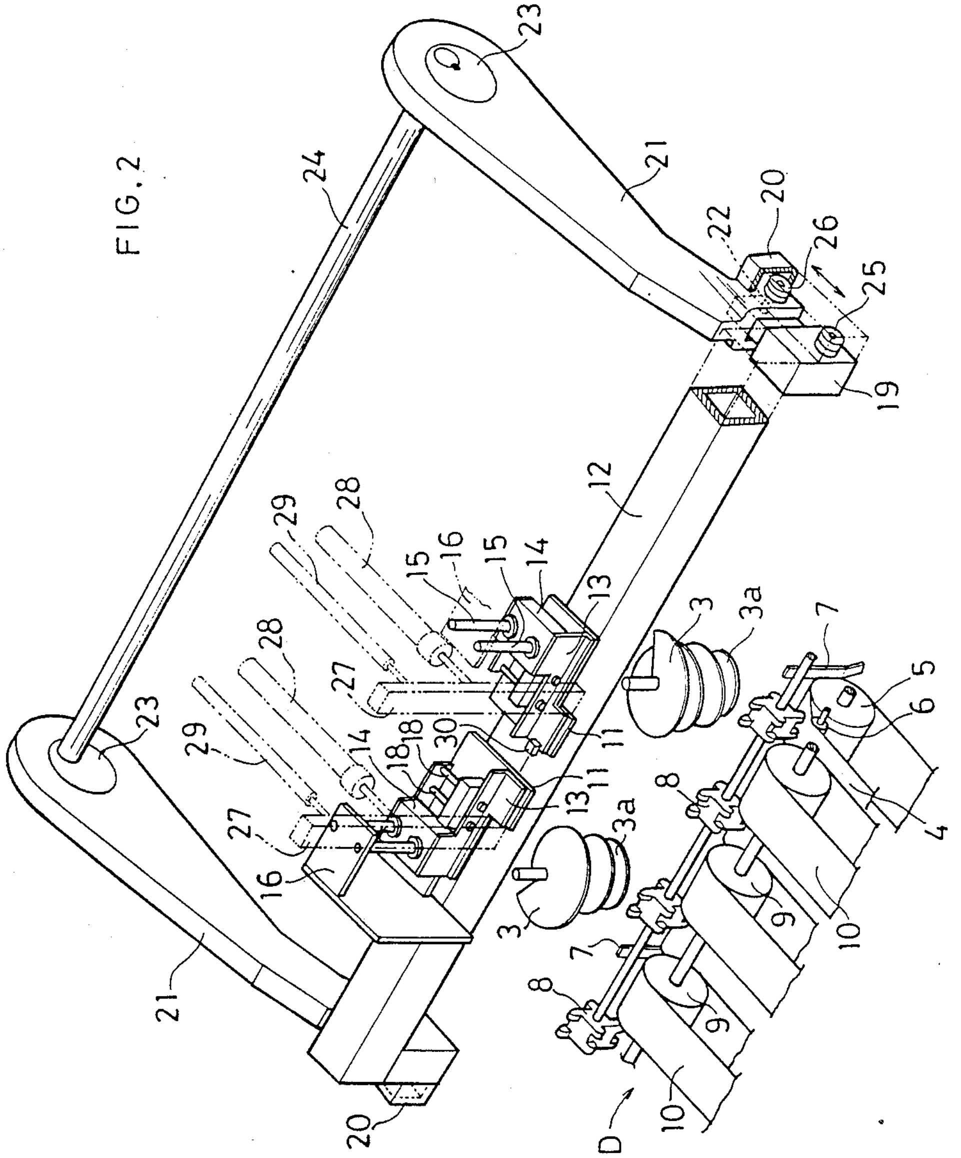
FIG. 2 is a perspective view of the main part of the corrugated cardboard box stacking device.

FIGS. 1 and 2 show the structures wherein the sheet is moved from the folding section E to the delivery section D.

A corrugated cardboard box A formed at the folding section E is folded flat as shown in FIG. 1. The cardboard box A is successively fed one by one to the delivery section D by belts 2*a*,2*b* wound around a pair of feed rollers 1*a*,1*b* positioned at the end of the folding section E.

At a starting end of the delivery section D, there are disposed a pair of rotary screws 3 at right and left sides and a feed belt 4. The rotary screw 3 is provided with a spiral vane 3*a* as illustrated. With rotation of the rotary screws 3, the corrugated cardboard box A placed on the spiral vane 3*a* is moved upward. The feed belt 4 is wound around rollers 5,6 and the like and moves in the direction of arrow. The box A transported from the pair of feed rollers 1*a*,1*b* is forwarded onto the feed belt 4 passing through the rotary screws 3 disposed at right and left sides and is stopped by a back stopper 7 arranged above the feed belt 4 after it is conveyed some distances by the feed belt 4. The back stopper 7 is formed so as to be provided with a predetermined height.

A delivery belt 10 is arranged obliquely above the feed belt 4. The delivery belt 10 is wound around a transport roller 9 and the like and is moved in the direction of arrow to discharge the corrugated cardboard boxes A at a predetermined position. Between the top portion of the back stopper 7 and a starting end of the delivery belt 10, there is arranged a rotary stopper 8. The rotary stopper 8 is provided with protrusions 8*a* at four parts and is rotated 90° in the direction of arrow at a predetermined time. Designated by numeral 8*b* is a supporting surface of the rotary stopper 8 and 8*c* a stopper surface of the rotary stopper 8.

Figure 3:
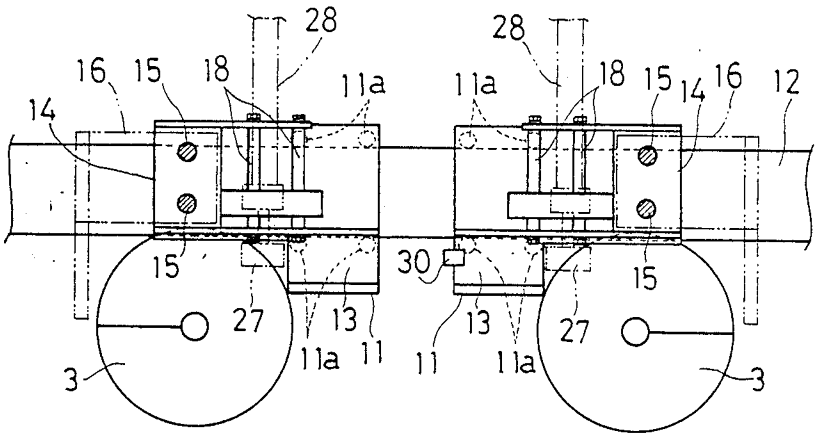
FIG. 3 is a plan view of the main part of the corrugated cardboard box stacking device.

At a mid-portion above the pair of feed rollers 1*a*,1*b* and the rotary screws 3, there is provided a pair of gauge plates 13 at right and left sides. The gauge plate 13 is formed in L-shape in cross section and comes in contact with the uppermost box of a group of the corrugated cardboard boxes A stacked and stored on the rotary screws 3 and the feed belt 4 to regulate the height of the group of the boxes A stored therein. The gauge plate 13 is fixed to a support member 14 as shown in FIGS. 1 through 3. The support member 14 is adjustably supported for upward and downward positions by a fixed plate 16 through a pair of vertical rods 15.

At the lower positions of each gauge plate 13, there are disposed kickers 11 which move forward and backward along the lower surface of the gauge plate 13. The kicker 11 is made of a plate member and provided with four pieces of pins 11*a* projecting downwardly to engage with a slapper bar 12 and is arranged to move forward and backward correlatively with the forward and backward movement of the slapper bar 12. The kicker 11 is guided to move forward and backward by a pair of guide rods 18 provided between the back 14*a* of the support member 14 and the gauge plate 13.

Figure 4:
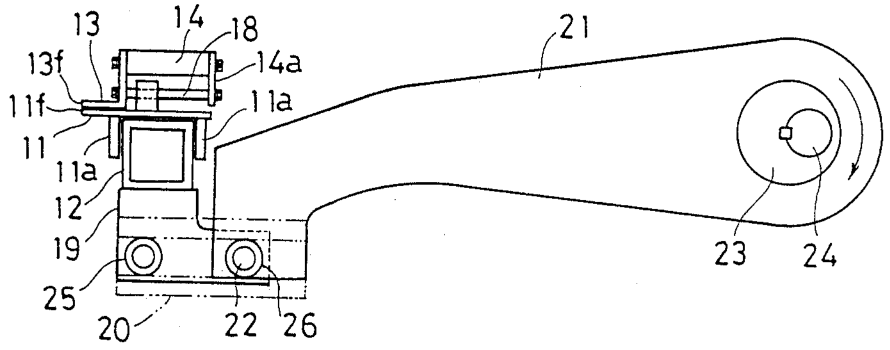
FIGS. 4 and 5 are side views each showing the action of forward and backward movement of a kicker.
Figure 5:
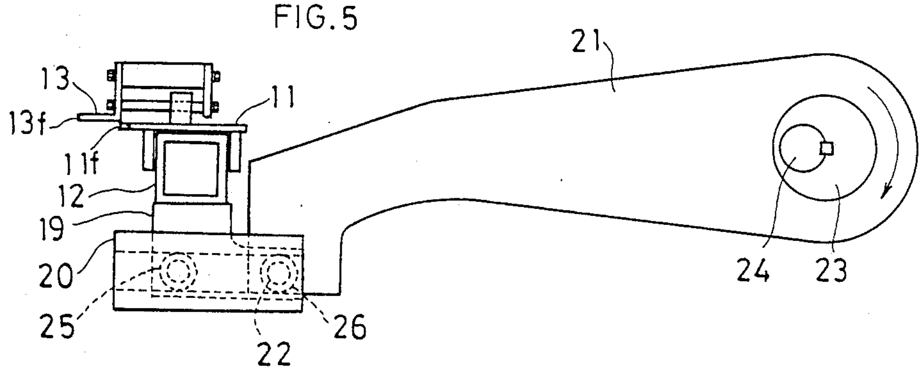

Both ends of the slapper bar 12 are attached to sliders 19 as shown in FIGS. 2, 4 and 5, and the sliders 19 are movably supported for forward and backward movement by guide rails 20. The slider 19 is connected to the tip of a connecting arm 21 through a pin 22. The base edge of the connecting arm 21 is fixed to a rotary shaft 24 through an eccentric collar 23. Designated by numerals 25,26 are guide rollers which are guided and rotatively moved by the guide rail 20. When the rotary shaft 24 is rotated to the position shown in FIG. 4, the slapper bar 12 is thus moved to the forefront position and the kicker 11 is also moved to the forefront position correlatively. At this time, the tip 11*f* of the kicker 11 is positioned substantially just below the tip 13*f* of the gauge plate 13. On the other hand, when the rotary shaft 24 is rotated to the position shown in FIG. 5, the slapper bar 12 is moved to the most retreated position and the kicker 11 is also moved to the most retreated position correlatively. At this time, the tip 11*f* of the kicker 11 is largely retreated from the tip 13*f* of the gauge plate 13.

At the adjacent portions of each gauge plate 13, pusher bars 27 are arranged as shown in FIGS. 1 and 2. The lower edge of the pusher bar 27 is positioned almost the same height as the lower surface of the guage plate 13. The front surface 27*f* of the pusher bar 27 is positioned almost the same position as that of the tip 13*f* of the gauge plate 13 at a regular position as shown by a solid line in FIG. 1. The pusher bar 27 is moved forward to the position shown by phantom line in FIG. 1 by an air cylinder 28. The numeral 29 represents a guide tube.

At the end of one of the gauge plates 13, there is disposed, as shown in FIGS. 2 and 3, a sensor 30 for counting the number of corrugated cardboard boxes A conveyed one by one in the horizontal direction by the kicker 11.

Action of the above-mentioned device will then be described below.

In FIG. 1, there is shown a corrugaged cardboard box A which is folded flat and is being fed toward the feed belt 4 from the pair of feed rollers 1*a*,1*b*. The box A is transported onto the feed belt 4 passing through the rotary screws 3 arranged at right and left sides and is then forwarded by the feed belt 4 until it hits the back stopper 7 and is stopped thereat. As a result, the front portion of the corrugated cardboard box A is supported on the feed belt 4 and both rear sides of the box A are supported on the spiral vanes 3*a* of the rotary screws 3. During the time when the box A is moved from the pair of feed rollers 1*a*,1*b* to the feed belt 4, the rotary screws 3 make one cycle of rotation and raise the rear end of the box A along the inclined surface of the spiral vanes 3*a*.

Figure 6:
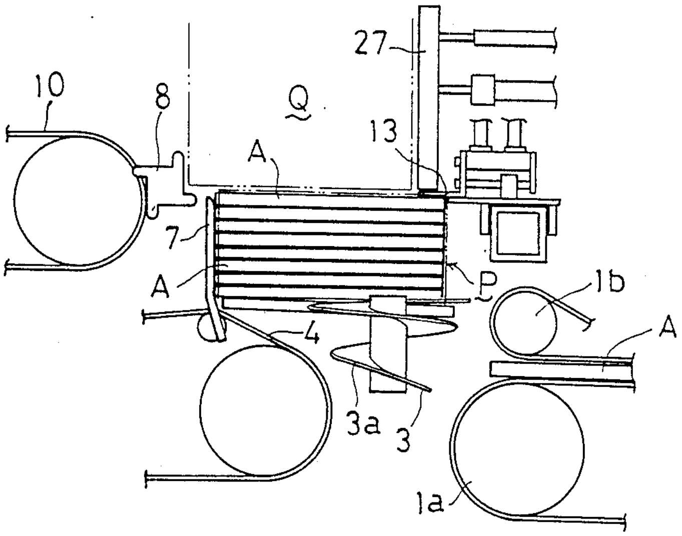
FIGS. 6 through 9 are side views each showing the action of the corrugated cardboard box stacking device.

The next corrugated cardboard box A is successively conveyed and supported by the feed belt 4 and the rotary screws 3 at the position below the cardboard box A previously forwarded. With repetition of this action, newly conveyed cardboard boxes A are stacked below a group of the cardboard boxes A previously stored therein to result in the state as shown in FIG. 6. FIG. 6 shows a state wherein a predetermined number of sheets of the corrugaged cardboard boxes A are stacked and stored in the vertical direction, at which the gauge plate 13 comes in contact with the surface of the uppermost box and regulates the height of the group of the corrugated cardboard boxes A stored therein.

Figure 7:
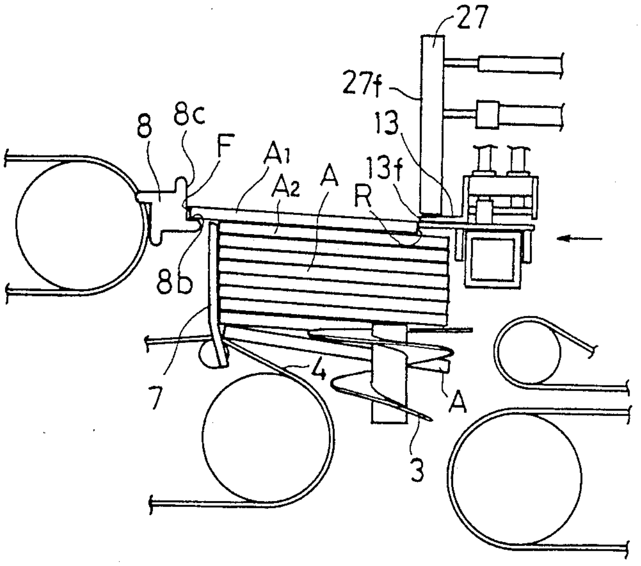

The kicker 11 is then moved forward as shown in FIG. 7 and pushes out the uppermost box $A_1$ and guides the front end of the cardboard box $A_1$ onto the supporting surface 8*b* of the rotary stopper 8. The corrugated cardboard box $A_1$ being moved forward is stopped when the tip F of the box $A_1$ is reached the position where it comes in contact with the stopper surface 8*c* of the rotary stopper 8. At this stage, the rear end R of the box $A_1$ is positioned slightly ahead of the front surface 27*f* of the pusher bar 27 and the tip 13*f* of the gauge plate 13. Thereafter, the kicker 11 is retreated and returned to the original position. Below a group of corrugated cardboard boxes A being stored in the vertical direction, boxes A are successively transported from the pair of feed rollers 1*a*,1*b* and the group of the boxes A is lifted. Consequently, a corrugated cardboard box $A_2$ which was second from the top is positioned uppermost. The kicker 11 is then moved forward again and the box $A_2$ positioned uppermost is advanced. Thereafter, the same action is repeated, and every time when the box A is advanced by the kicker 11, the number of sheets are counted by the sensor 30 (FIG. (2).

Figure 8:
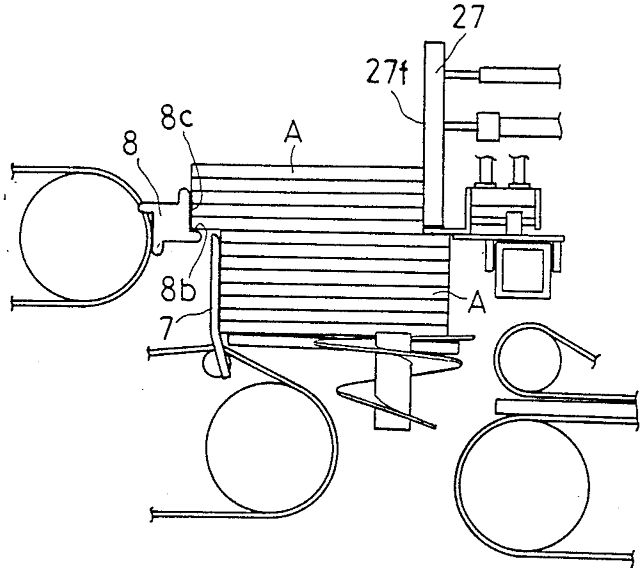

With the action of the kicker 11 and the lifting function of the rotary screws 3, the cardboard boxes A are stored in the vertical direction for a predetermined number of sheets (for instance, 20 sheets) in the area between the front surface 27*f* of the pusher bar 27 and the stopper surface 8*c* of the rotary stopper 8 as shown in FIG. 8.

Figure 9:
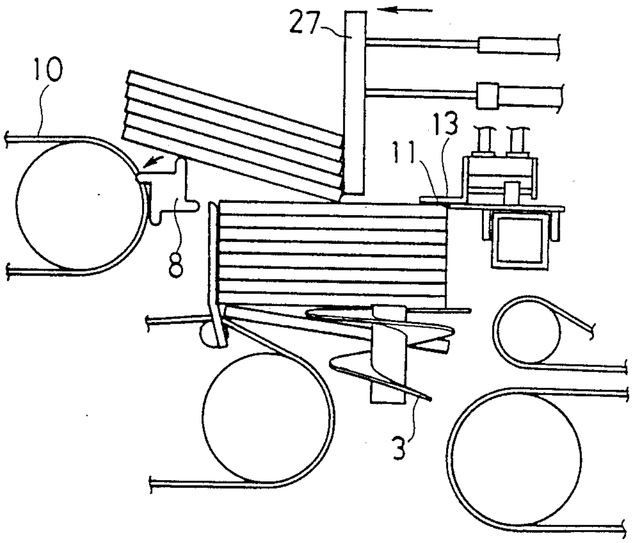
Figure 10:
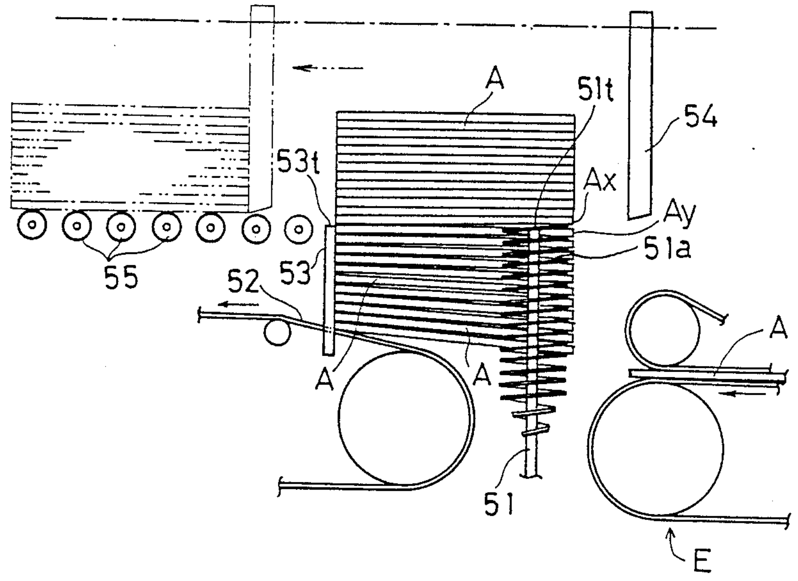
FIG. 10 PRIOR ART
FIG. 10 is a side view showing a prior art of a corrugated cardboard box stacking device.

When the number of sheets of the corrugated cardboard boxes A are reached a predetermined number and so counted by the sensor 30, the pusher bar 27 and the rotary stopper 8 are operated. In other words, the pusher bar 27 is advanced and the rotary stopper 8 is rotated 90° in the direction of arrow as shown in FIG. 9. Accordingly, the group of corrugated cardboard boxes A stopped and stored by the rotary stopper 8 is released and pushed by the pusher bar 27 to be conveyed onto the delivery belt 10. The predetermined number of sheets of the corrugated cardboard boxes conveyed onto the delivery belt 10 are discharged at a predetermined position by the delivery belt 10, during which period of time, the pusher bar 27 is retreated and returned to the original position.

By repeating a series of actions described above, the corrugated cardboard boxes A fed one by one from the folding section E reach a predetermined number of sheets at the delivery section D, and a group of the corrugated cardboard boxes A can thus be intermittently discharged.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. A corrugated cardboard box stacking device in a corrugated cardboard box making machine, comprising:

a feed means for feeding manufactured and folded corrugated cardboard boxes one by one in the horizontal direction;

a front portion support means for supporting the front portion of the corrugated cardboard box fed from the feed means at a predetermined position in the longitudinal direction;

a pair of rotary screws arranged at right and left sides for stacking the corrugated cardboard boxes in a group from a lower to an upper portion in the area between the rotary screws, said rotary screws being arranged at intermediate position between the feed means and the front portion support means in the longitudinal direction for supporting a corrugated cardboard box fed from the feed means at its both sides to raise the corrugated cardboard box into a storing space by rotation;

a gauge plate which comes in contact with the upper surface of the rear end of the uppermost box in the group of the corrugated cardboard boxes for regulating the number of corrugated cardboard boxes to be stacked in the corrugated cardboard box storing space, which is positioned above the support means and the rotary screws;

a kicker which moves forward and backward along the under surface of the gauge plate and pushes out the uppermost corrugated card box to advance it a little ahead of the front edge of the gauge plate;

a count means for counting the number of the corrugated cardboard boxes moved from the storing space to a box stacking space, which is positioned above and a little ahead of the storing space by the pushing action of the kicker and the lifting action of the rotary screws;

a pusher bar for transporting a group of the corrugated cardboard boxes in the box storing space by moving them forward when the number of the corrugated cardboard boxes stacked from below in the storing space reached a predetermined number; and a discharge means for discharging the group of the stacked corrugated cardboard boxes conveyed by the pusher bar.

2. The corrugated cardboard box stacking device in a corrugated cardboard box making machine as defined in claim 1, wherein a rotary stopper is disposed in front of the corrugated cardboard box stacking space, and the front edge portion of the corrugated cardboard box is supported on the supporting surface of the rotary stopper, while the front edge position of the corrugated cardboard box is regulated by the stopper surface of the rotary stopper, and the rotary stopper is rotated when the pusher bar is advanced to guide a group of the corrugated cardboard boxes in the box stacking space to the discharge means.

3. The corrugated cardboard box stacking device in a corrugated cardboard box making machine as defined in claim 1, wherein the pusher bar is generally positioned behind the corrugated cardboard box stacking space to regulate a position of the rear end of the box and is returned to the original position after its advance action is taken.

* * * * *